US008101076B2

(12) United States Patent
Moretto

(10) Patent No.: US 8,101,076 B2
(45) Date of Patent: Jan. 24, 2012

(54) FILTER CARTRIDGE FOR JUGS

(75) Inventor: Maurizio Moretto, Vicenza (IT)

(73) Assignee: Laica S.p.A, Barbarano Vicentino (VI) (IT)

( * ) Notice: Subject to any disclaimer, the term of this patent is extended or adjusted under 35 U.S.C. 154(b) by 869 days.

(21) Appl. No.: 12/158,574

(22) PCT Filed: Dec. 4, 2006

(86) PCT No.: PCT/EP2006/011595
§ 371 (c)(1),
(2), (4) Date: Jun. 20, 2008

(87) PCT Pub. No.: WO2007/073822
PCT Pub. Date: Jul. 5, 2007

(65) Prior Publication Data
US 2008/0264853 A1 Oct. 30, 2008

(30) Foreign Application Priority Data

Dec. 23, 2005 (IT) .................................. PD05A0378
Jul. 21, 2006 (EP) ..................................... 06015200

(51) Int. Cl.
*B01D 27/00* (2006.01)
*C02F 1/00* (2006.01)
(52) U.S. Cl. ........................ 210/232; 210/464; 210/477
(58) Field of Classification Search .................. 210/232, 210/464, 477, 479
See application file for complete search history.

(56) References Cited

U.S. PATENT DOCUMENTS

| 1,098,653 | A | * | 6/1914 | Whisenant ..................... 215/386 |
| 3,864,262 | A | * | 2/1975 | Lang et al. ................ 210/167.14 |
| 4,741,828 | A | * | 5/1988 | Alhauser et al. ............... 210/264 |
| 4,998,228 | A | | 3/1991 | Eger et al. |
| 6,395,170 | B1 | | 5/2002 | Hughes et al. |
| 2002/0134715 | A1 | | 9/2002 | Tanner et al. |

FOREIGN PATENT DOCUMENTS

| DE | 9207977 U1 | 11/1992 |
| EP | 1253114 A2 | 10/2002 |
| GB | 2197647 A | 5/1988 |
| WO | 0127034 A1 | 4/2001 |
| WO | 2005118481 A | 12/2005 |
| WO | 2006126237 A2 | 11/2006 |

* cited by examiner

Primary Examiner — Fred Prince
(74) Attorney, Agent, or Firm — Volpe and Koenig, P.C.

(57) ABSTRACT

A filter cartridge for jugs is provided. The cartridge includes a first chamber in which there is provided filtering material which is able to filter water or liquids in general and in which there are defined an inlet and an outlet to allow the passage of water through the first chamber in contact with the filtering material. The cartridge also includes a second chamber which communicates with the first chamber in order to collect the water being discharged from the first chamber. The second chamber includes an opening for discharging the water from the cartridge. The discharge opening is open in the second chamber at a level that is higher than a base of the second chamber, in which the water being discharged from the first chamber is collected.

20 Claims, 3 Drawing Sheets

FILTER CARTRIDGE FOR JUGS

FIELD OF THE INVENTION

The present invention relates to a filter cartridge for jugs.

BACKGROUND

The invention is used preferably, though in a non-exclusive manner, in the context of jugs for domestic use, which are widely used to purify and/or filter, for consumption purposes, water taken from the urban mains water network.

Jugs of this type typically comprise a first vessel for collecting the water to be filtered and a second vessel which communicates with the first vessel by a suitable pipe, in which there is accommodated a suitable filter cartridge. The water admitted into the first vessel flows, generally simply by the effect of gravity, through the filter cartridge, thereby flowing into the second vessel, in which it is collected and made available for use. The filter cartridge comprises a chamber, in which filtering material based on activated carbon and/or resin with ionic exchange is contained and through which the water to be filtered is caused to pass in order to fall into the second vessel of the jug.

Since the degree of filtration of the water depends on the time of contact between the water and the filtering material present in the cartridge, it is desirable that the contact time is as constant as possible during the entire phase involving passage from the first vessel to the second vessel of the jug. However, this ideal condition is far from being fulfilled in conventional jugs. The operation for filtering the water is in fact of a discontinuous type, bringing about almost instantaneous pouring of all the water to be filtered in the first vessel and allowing it then to pass by falling into the second vessel.

In that manner, the rate of flow of water through the cartridge (and therefore the time that it spends inside the cartridge) is variable over time, generally being inversely proportional to the height of the column of water present in the first vessel and acting on the filter cartridge. Not only that, the filtered water collected in the second vessel can reach and exceed in terms of height the base of the filter cartridge, bringing about a corresponding counter-pressure which further slows down the passage of the water from the first vessel to the second.

In definitive terms, it is found that the contact time of the water with the filter cartridge is relatively short for the first portion of water which passes from the first vessel to the second and, conversely, is relatively long for the last portion thereof.

In attempting to regularize this phenomenon, there have been provided various technical solutions, one of which provides that the filtered water from the cartridge returns along the pipe in which the cartridge is accommodated and is admitted into the second vessel through a hole which is formed at a location higher than the base of the cartridge, in the vicinity of the first vessel. In that manner, the counter-pressure effect resulting from the water present in the second vessel is at least prevented or limited.

However, the results obtained by known jugs are not satisfactory and the above-described disadvantage is not substantially resolved.

SUMMARY

The present invention relates to a filter cartridge for jugs including a first chamber in which there is provided filtering material which is able to filter water or liquids in general and in which there are defined an inlet and an outlet to allow the passage of water through the first chamber in contact with the filtering material. The cartridge also includes a second chamber which communicates with the first chamber in order to collect the water being discharged from the first chamber. The second chamber includes an opening for discharging the water from the cartridge. The discharge opening is open in the second chamber at a level that is higher than a base of the second chamber, in which the water being discharged from the first chamber is collected.

BRIEF DESCRIPTION OF THE DRAWINGS

The features and advantages of the invention will be better appreciated from the detailed description of some preferred embodiments thereof, illustrated purely by way of non-limiting example with reference to the appended drawings, in which.

DETAILED DESCRIPTION OF THE PREFERRED EMBODIMENTS

Figure 1:
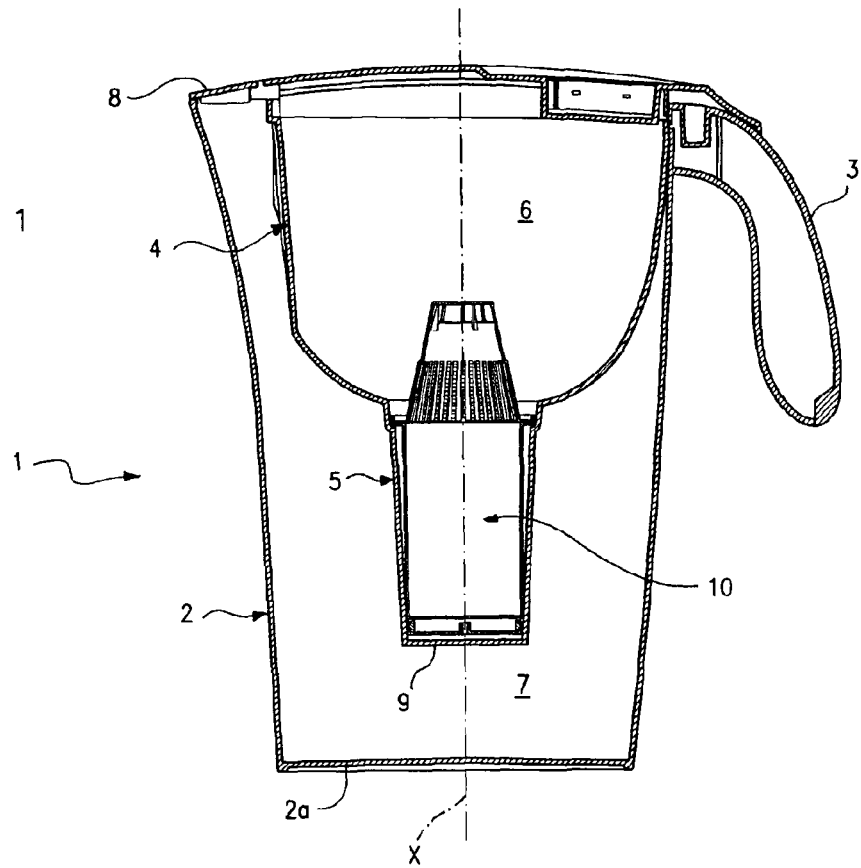
FIG. 1 is a schematic longitudinal section of a jug comprising a filter cartridge constructed according to the present invention.

In the Figures, a jug for domestic use for filtering water or liquids in general is generally designated 1 and comprises a filter cartridge 10 which is constructed in accordance with the present invention.

The jug 1 comprises a receptacle 2 which is provided with a support plane 2a and a handle 3 and in which there is introduced, at the upper opening thereof opposite the support plane 2a, a container 4. There is provided, at the base of the container, a pipe 5 which is open towards the receptacle 2 so as to place the interior of the container 4, defining a first vessel 6 of the jug 1, in communication with the interior of the receptacle 2, defining a second vessel 7 of the jug 1.

A filter cartridge 10 is accommodated in the pipe 5 in a removable manner so that the water admitted into the first vessel 6, percolates, under the action of gravity, through the cartridge 10 and flows into the second vessel 7, where it collects ready to be poured from the jug through a spout 8.

The cartridge 10 is accommodated in the pipe 5 in a substantially tight manner in order to prevent leaks of water between the first vessel and the second vessel without the necessary passage through the cartridge.

The pipe 5 is developed along an axis X which is substantially perpendicular to the support plane 2a, thereby being substantially vertical, and has a substantially cylindrical form, preferably with a circular or elliptical cross-section, which is slightly tapered in the direction of the second vessel 7, at the side at which a wide opening 9 is provided for the passage of the filtered water.

The cartridge 10 comprises a main body 11 of substantially similar form to that of the pipe 5 so as to be introduced therein by simple pressure. There is provided, in the main body 11, a suitable filtering material 12 which is granular, conventional per se, and only partially represented in FIG. 2 for reasons of clarity. In particular, the filtering material 12 is contained inside a first chamber 13 which is formed in the main body 11. There is defined in the first chamber 13 an inlet 14 for allowing water to come into contact with the filtering material 12 and, at the end axially opposite the inlet 14, the first chamber 13 is delimited by a bottom wall 15, from which the water can be discharged by falling once it has passed through the first chamber 13.

The bottom wall 15 preferably comprises a plurality of through-holes 15a, whose dimensions are such that they allow a liquid to be discharged but, at the same time, are able to prevent the movement of the filtering material 12 out of the first chamber 13.

The cartridge 10 further comprises a second chamber 16 which communicates with the first chamber 13 and is arranged immediately downstream thereof so as to collect the water being discharged from the bottom wall 15.

The second chamber 16, at the side opposite the bottom wall 15, is delimited by a base 17 which is substantially parallel with the bottom wall 15.

In accordance with a first feature of the present invention, a sleeve-like formation 18 of cylindrical form which is coaxial with the first chamber 13 and second chamber 16 extends from the base 17 towards the bottom wall 15. The sleeve-like formation 18 and the base 17 are perforated by a passage 19, which is also developed along axis X and which is open at the opposing axial ends in the region of the upper 18a of the sleeve-like formation 18 (towards the interior of the second chamber 16) and in the region of the base 17 (towards the exterior of the cartridge 10).

In that manner, the water being discharged from the first chamber 13 collects at the bottom 17 and, before being discharged from the second chamber 16 (and therefore from the cartridge 10) through the passage 19, necessarily has to reach a minimum level defined by the distance between the base 17 and the upper 18a of the sleeve-like formation 18.

The sleeve-like formation 18 is located centrally relative to the base 17 and the portion of bottom wall 15 immediately above it is not provided with any openings 15a.

The sleeve-like formation 18 preferably extends inside the second chamber 16 to a height that is at least equal to half of the distance between the bottom wall 15 of the first chamber 13 and the base 17 of the second chamber 16. This is advantageously between 2 and 10 mm, and the sleeve-like formation 18 can be between 1 and 8 mm and the passage 19 preferably has a diameter of between 0.5 and 3 mm.

The measurements set out above are intended to be understood as being indicative and may vary in accordance with the geometric and operative characteristics of the cartridge 10.

There is further provision for the sleeve-like formation 18 to be able to extend from various regions of the base 17, and to be greater than one in number.

Figure 2:
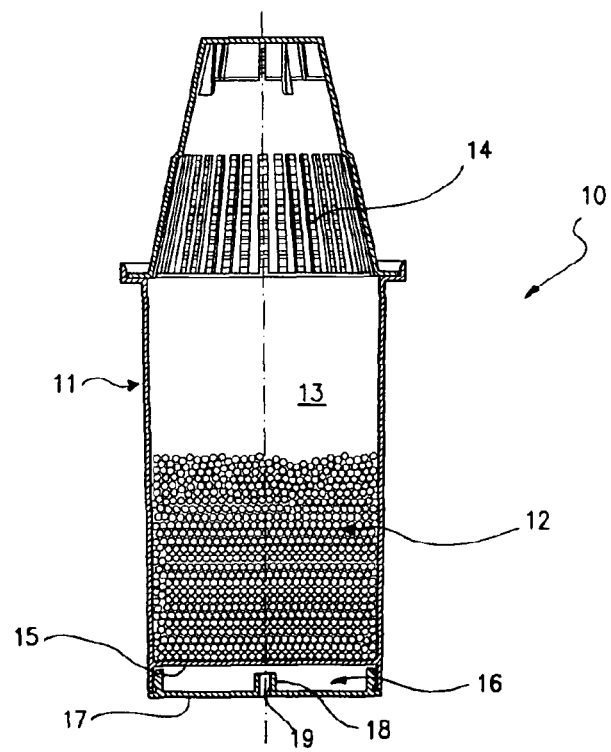
FIG. 2 is a longitudinal section, drawn to an enlarged scale, of the cartridge of FIG. 1.
Figure 3:
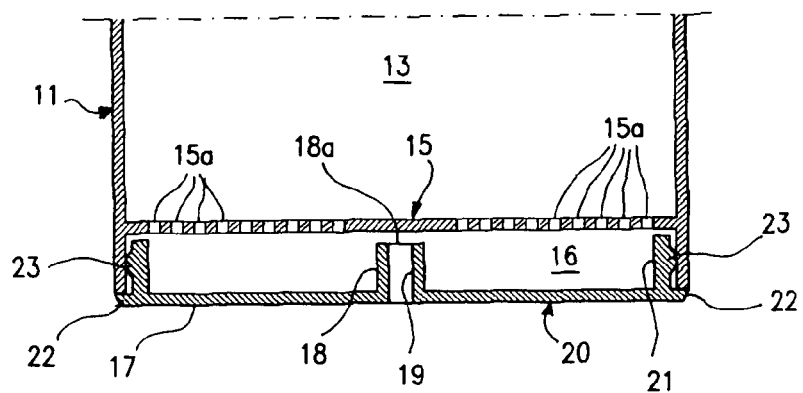
FIG. 3 is a sectional view, drawn to a further enlarged scale, of a detail of the cartridge of FIG. 2, FIG. 4, FIG. 5, FIG. 6 and FIG. 7 are views similar to FIG. 3 of respective construction variants of the cartridge of FIG. 2.

In a first embodiment of the invention illustrated in FIGS. 1 to 3, the main body 11 which is preferably obtained by injection-moulding plastics material, defines a lateral outer surface of both the first and second chambers 13 and 16 as well as the bottom wall 15 of the first chamber 13. A stopper which is generally designated 20 in FIG. 3 is therefore removably engaged with the main body 11 and defines the base 17 of the second chamber 16. The stopper 20 comprises the sleeve-like formation 18 and an annular collar 21 which extends in alignment therewith and is able to engage with the main body 11, in particular in the region of a raised portion 23 provided on the collar 21. The main body 11, in the engagement condition, is placed against a lip 22 of the stopper 20 extending externally relative to the collar 21.

Figure 4:
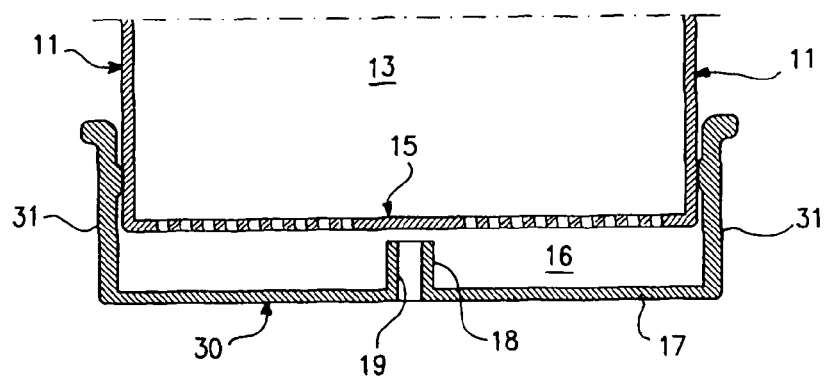

In a second embodiment illustrated schematically in FIG. 4, the main body 11 defines the lateral outer surface of the first chamber 13 and the bottom wall 15. Therefore, a beaker-like element which is generally designated 30 in FIG. 4 is removably engaged with the main body 11 and defines the lateral outer surface and the base 17 of the second chamber 16. Similarly to the above example, the beaker-like element 30 comprises the sleeve-like formation 18 and a collar 31 which extends from the peripheral edge thereof and which can engage with the main body 11, in this case in the region of the lateral outer surface of the first chamber 13.

Figure 5:
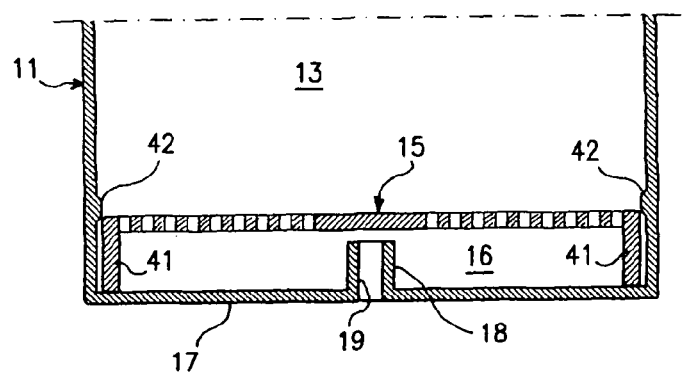

In a third embodiment illustrated in FIG. 5, the main body 11 defines the lateral outer surface of the first and second chamber 13, 16 as well as the base 17 of the second chamber 16.

Therefore, the bottom wall 15 is removably inserted inside the main body 11 and is advantageously provided with a collar 41 which extends from the peripheral edge thereof in order to be placed against the base 17 so as to maintain the desired distance between the bottom wall 15 and the base 17.

The bottom wall 15 is held in position by a raised portion 42 which is provided circumferentially on the internal surface of the main body 11 and which is able to snap-fit with the bottom wall 15.

Figure 6:
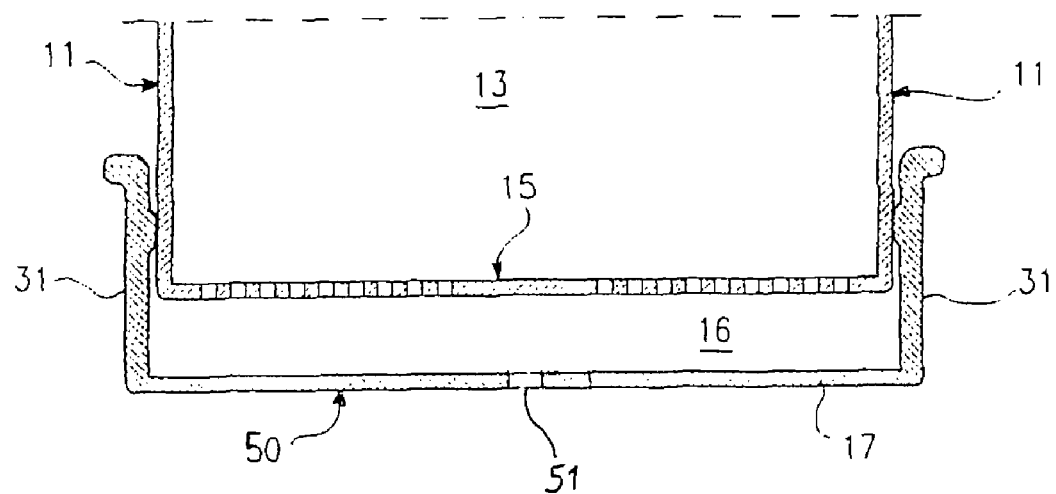

In a fourth embodiment illustrated in FIG. 6, substantially equivalent to the embodiment of FIG. 4, the main body 11 defines the lateral outer surface of the first chamber 13 and the bottom wall 15. A beaker-like element generally designated 50, defining the lateral outer surface and the base 17 of the second chamber 16, is removably engaged with the main body 11. The beaker-like element 50 has a hole or passage 51 for choking the flow going out of the cartridge, replacing the sleeve-like formation 18. The beaker-like element 50 acts as a stopper and is advantageously replaceable with other similar elements having choking holes 51 of different diameter so as to adjust the flow going out of the cartridge in view of the physical and chemical parameters of the water to be filtered.

Figure 7:
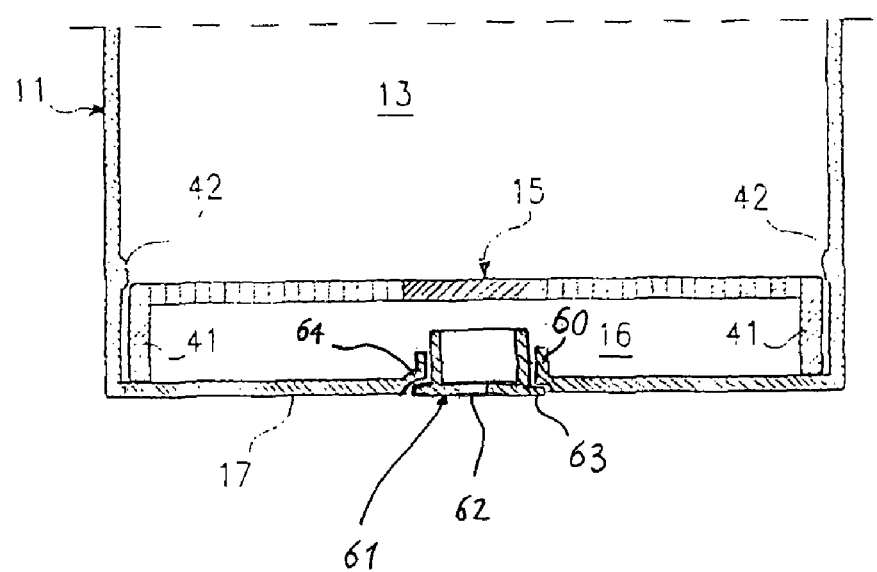

In a further embodiment illustrated in FIG. 7, a seat 60 for a stopper 61, in turn provided with a choking hole 62, is provided on the base 17 of the second chamber. Preferably, the stopper 61 is removably engaged in the seat 60 and is replaceable with other stoppers having holes of different diameter. In a preferred embodiment, the stopper 61 has an outer circumferential flange 63 and is housed flush in the seat 60 so as to restore the surface of the base 17. In order to facilitate the removal and replacement of the stopper 61, a recess 64 is provided on the seat 60 in order to make the access to the flange 63 easier.

As set out above, the water in the passage passes through the cartridge 10, passes by gravity from the first chamber 13, where it is filtered as a result of contact with the filtering material 12, to the second chamber 16, through the through-holes 15a which are formed in the bottom wall 15.

The water collects at the base 17 and is discharged from the second chamber 16 through the passage 19 after having formed a head of liquid at least equal to the height of the sleeve-like formation, whilst a residual quantity of air remains in the upper portion of the second chamber 16.

The Applicant has carried out tests directed towards determining the variation in time of the discharge times of water passing between the first vessel and the second vessel of a jug.

The tests were carried out using the same jug, by pouring the same quantity of initial water into the container and measuring the necessary times until successive portions of the initial water had passed into the second vessel. The jug was provided, in a first series of tests, with a conventional cartridge and, in a second series of tests, with a cartridge according to the present invention.

Those tests surprisingly showed how the differences in time taken by the first portion of water relative to the second portion, the third and the subsequent portions, are substantially reduced, if not dispensed with, in the case in which the jug is provided with the cartridge according to the invention. In other words, the cartridge of the invention brings about a substantial regularization of the flow of water from the first vessel to the second vessel of the jug, making the contact times between the water and the filtering material only dependent in a limited manner on the quantity of water admitted into the first vessel and the water present in the second vessel.

Therefore, the present invention solves the problem set out above with reference to the prior art mentioned, at the same time providing a number of other advantages, including the possibility of obtaining homogeneous filtration of all the water admitted into a jug. A second advantage of the invention is constituted in that the filter cartridge can have more precise and correct dimensions.

The invention claimed is:

1. A filter cartridge for jugs, comprising:
   a first chamber in which there is provided filtering material which is able to filter water or liquids in general and in which there are defined an inlet and an outlet in order to allow the passage of water through the first chamber in contact with the filtering material,
   a second chamber which communicates with the first chamber in order to collect the water being discharged from the first chamber, in which there is defined an opening for discharging the water from the cartridge,
   the discharge opening is open in the second chamber at a level that is lower than the outlet of the first chamber and higher than a base of the second chamber, in which the water being discharged from the first chamber is collected.

2. A cartridge according to claim 1, wherein there extends, from the base of the second chamber towards the interior thereof, at least one sleeve-like formation and the opening for discharge from the cartridge is defined by a passage which is formed in the sleeve-like formation and in the base, the passage being open at one side at the interior of the second chamber in a position remote from the base and, at the other side, at the exterior of the cartridge through the base.

3. A cartridge according to claim 2, wherein the sleeve-like formation is of cylindrical form and through which the passage extends axially.

4. A cartridge according to claim 3, wherein the first and the second chamber are separated by a bottom wall of the first chamber.

5. A cartridge according to claim 2, wherein the passage has a cross-section of between 0.5 and 3 mm.

6. A cartridge according to claim 2, wherein the first and the second chamber are separated by a bottom wall of the first chamber.

7. A cartridge according to claim 1, wherein the first and the second chamber are separated by a bottom wall of the first chamber.

8. A cartridge according to claim 7, wherein the base of the second chamber and the bottom wall of the first chamber are substantially parallel with each other.

9. A cartridge according to claim 8, wherein the bottom wall of the first chamber and the base of the second chamber are spaced apart from each other by a distance of between 2 and 10 mm.

10. A cartridge according to claim 8, wherein the opening for discharge from the cartridge is open in the second chamber at a distance from the base of the second chamber that is at least equal to half of the distance between the base of the second chamber and the bottom wall of the first chamber.

11. A cartridge according to claim 7, wherein the bottom wall of the first chamber and the base of the second chamber are spaced apart from each other by a distance of between 2 and 10 mm.

12. A cartridge according claim 11, wherein the opening for discharge from the cartridge is open in the second chamber at a distance from the base of the second chamber that is at least equal to half of the distance between the base of the second chamber and the bottom wall of the first chamber.

13. A cartridge according to claim 7, wherein the opening for discharge from the cartridge is open in the second chamber at a distance from the base of the second chamber that is at least equal to half of the distance between the base of the second chamber and the bottom wall of the first chamber.

14. A cartridge according to claim 7, wherein the opening for discharge from the cartridge is open in the second chamber at a distance of between 1 and 8 mm from the base of the second chamber.

15. A cartridge according to claim 7, wherein the bottom wall of the first chamber comprises a plurality of through-holes for supporting and retaining the filtering material.

16. A cartridge according to claim 1, comprising a main body which defines a lateral outer surface of the first and second chamber and the bottom wall of the first chamber, as well as a stopper which is fixed in a removable manner to the main body in order to define the base of the second chamber.

17. A cartridge according to claim 1, comprising a main body which defines a lateral outer surface and the bottom wall of the first chamber, as well as a beaker-like element which is fixed in a removable manner to the main body at the side of the bottom wall of the first chamber in order to define the base and a lateral outer surface of the second chamber.

18. A cartridge according to claim 1, comprising a main body which defines a lateral outer surface of the first and second chamber as well as the base of the second chamber, the bottom wall of the first chamber being force-fitted inside the main body in order to separate the first chamber from the second chamber.

19. A filter jug for filtering water and liquids in general, comprising a first vessel for collecting the water to be filtered, a second vessel for collecting the filtered water which communicates with the first vessel through a pipe in which the filter cartridge of claim 1 is accommodated.

20. A filter cartridge for jugs, comprising:
    a first chamber in which there is provided filtering material which is able to filter water or liquids in general and in which there are defined an inlet and an outlet in order to allow the passage of water through the first chamber in contact with the filtering material,
    a second chamber which communicates with the first chamber in order to collect the water being discharged from the first chamber, in which there is defined an opening for discharging the water from the cartridge,
    the discharge opening is provided in the second chamber on a stopper removably closing a base of the second chamber.

* * * * *